April 29, 1958 P. MAUBORGNE 2,832,550
FISHING REEL
Filed Nov. 21, 1951 2 Sheets-Sheet 1

INVENTOR
Paul Mauborgne
BY
AG'T

April 29, 1958 P. MAUBORGNE 2,832,550
FISHING REEL

Filed Nov. 21, 1951 2 Sheets-Sheet 2

INVENTOR
Paul Mauborgne
BY
AG'T

2,832,550

FISHING REEL

Paul Mauborgne, Bernouville, France

Application November 21, 1951, Serial No. 257,449

Claims priority, application France November 23, 1950

1 Claim. (Cl. 242—84.21)

This invention relates to fishing reels of the stationary drum type.

It is an object of this invention to permit the use on the one hand of a pick-up of the so-called "pail handle" type, that is a line winder the shape of which is that of a continuous metal loop without any free end, with on the other hand a spool of the so-called "skirt" type, that is a spool having its inner flange formed with a cylindrical wall surrounding the drum with some clearance.

Another object of this invention consists in providing an improved device for opening and closing the pick-up as well as an improved means for fixing it in either position.

It is a further object of this invention to enable the construction of an extremely light pick-up device consisting only of the aforesaid metal loop so that any part fast and associated with it for transmitting the required rocking movement may be dispensed with.

With a view more particularly to provide the first object set forth above the reel according to the invention comprises a pick-up pivotally mounted on the disc-centre part of the drum instead of being hingedly connected to the peripheral flanged portion thereof as in conventional designs. Besides, the locking device or if desired the whole or part of the actuating mechanism for rocking the pick-up member is completely enclosed inside the drum.

Another characteristic of the device according to the invention is that the main mechanism for promoting the rocking movement of the pick-up is fitted completely outside the drum and comprises essentially a member serving as a stop or check member acting upon the position of the pick-up when the relative rotational movement thereof is set up.

Still with a view more particularly to provide the first object of this invention the pick-up according thereto has the shape of a closed loop comprising in one portion a curvature protruding sufficiently to engage the check member during the movement of rotation of the pick-up about the axis of the reel so that, owing to the compulsory retraction of its protruding portions caused by the check member, the pick-up will be tilted about its rocking axis.

With a view mainly to carry out the second object set forth hereabove the pick-up device according to this invention is so arranged that its rocking movement is controlled along one portion, practically equal to about the first half, of its stroke, by the aforesaid check member whilst the second portion of its closing stroke takes place under the resilient impulse of a spring which, in addition, is adapted to sufficiently lock the pick-up device in its closed position and, possibly, in its open position.

In this specification the term "closed position" of the pick-up device indicates the position in which the pick-up proper, rotated, causes the line thread to be wound about the reel.

This invention affords several advantages of which the chief one is that the pick-up is closed with a smoother movement than when its entire closing stroke is produced by the release of a spring loaded during the opening stroke.

Another substantial advantage of the arrangement according to this invention is its much simpler and therefore more economical construction in comparison with prior arrangements wherein a real transmission at 90° of the movement of rotation from the reel axis to the rocking axis is effected through bevel toothed wheels or cam faces with roller followers.

More particularly, with the device according to this invention, the provision of a separate locking device may be dispensed with.

The affixed drawing forming part of this specification illustrates diagrammatically by way of example one possible embodiment of the invention but it will be understood that the construction thereof, the arrangement of the various parts and the materials used in its manufacture may be modified without departing from the spirit and scope of the invention. In the drawings.

Figures 1, 6:
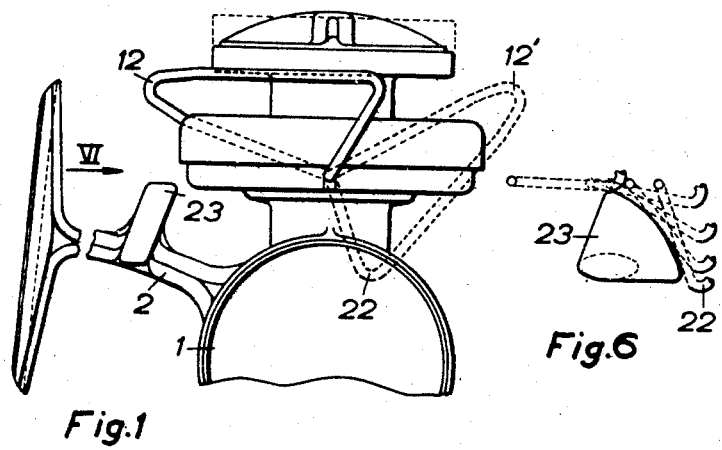
Fig. 1 is a plane view of a reel according to the invention as seen in the direction of the crank axis.
Fig. 6 is a side view of the device as seen in the direction of the arrow VI of Fig. 1.

Referring now to the drawing, 1 designates the reel body fixed through a support 2 to a fishing rod (not shown). A shaft 3 is journaled in the body 1 and carries a spool 4 of the so-called "skirted" type, that is a spool comprising a cylindrical portion 5 extending downwards and surrounding with some clearance a corresponding cylindrical portion 6 of the drum 7 extending upwards. The latter is actuated by a crank 8 the movement of which is transmitted through a bevel wheel 9 and a bevel pinion 10.

From the above general description it will be seen that the reel is of the known "stationary drum" type, that is a type wherein the drum axis is parallel with the axis of the fishing rod, both drum and spool remaining stationary during the unwinding of the thread. In this type the thread or line is usually wound on the spool through the conventional device called line pick-up device.

The pick-up device 12 according to this invention belongs to the known type called "pail handle' 'and consists of a metal wire loop having no free end. In the embodiment illustrated both ends 13, 14 of the pick-up are pivotally mounted in the disc-centre part of the drum.

Figures 3, 4, 5:
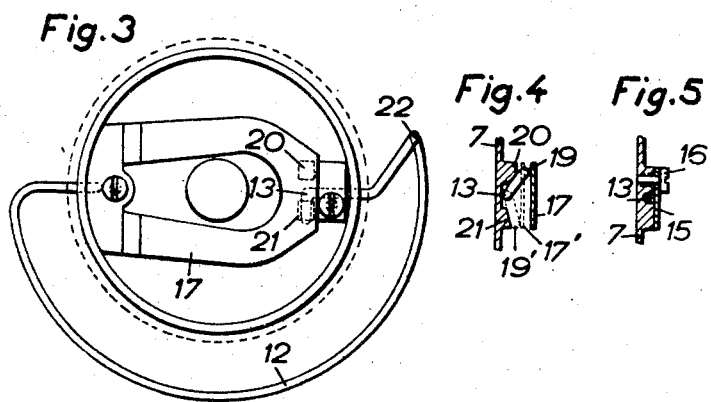
Fig. 3 is a plane view of the device as seen in the direction of the reel axis, the reel being removed for the sake of clarity.
Fig. 4 is a sectional view according to the line IV—IV of Fig. 2.
Fig. 5 is a sectional view according to the line V—V of Fig. 2.
Figure 2:
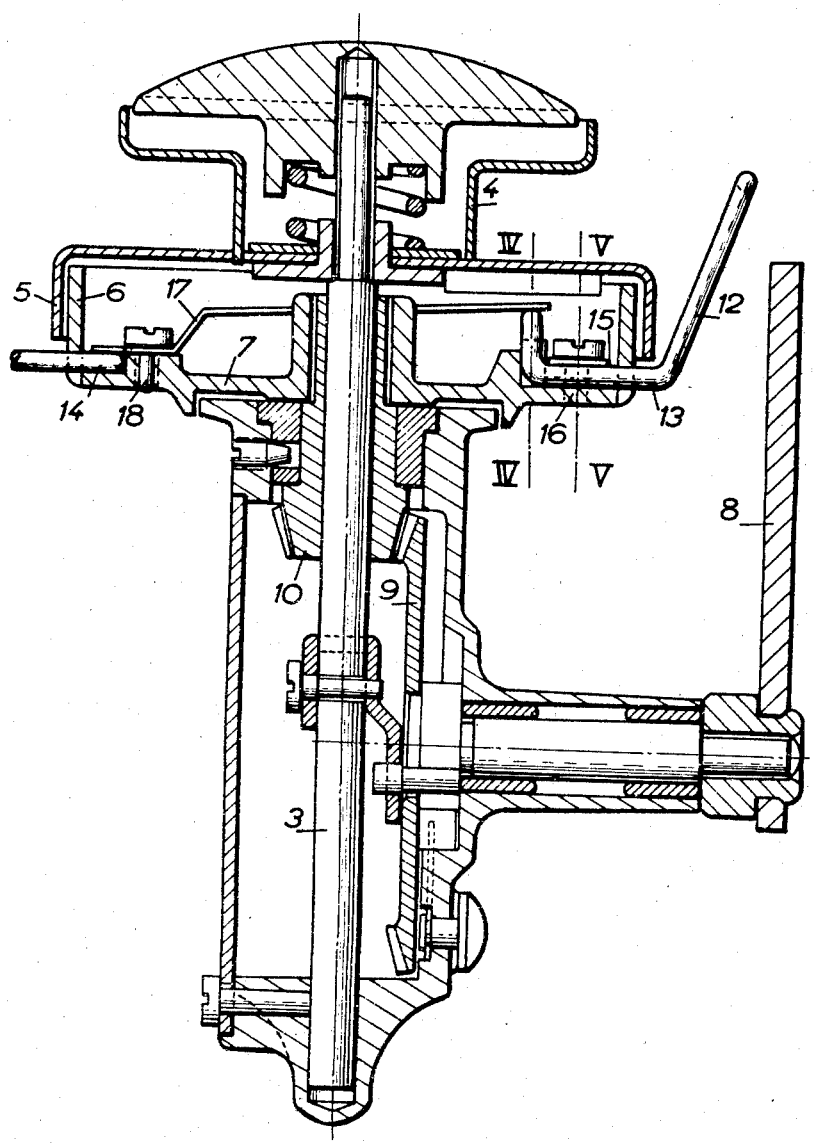
Fig. 2 is an axial section of same.

This pivotal mounting is extremely simple: as illustrated more particularly in Fig. 5, both ends 13, 14 engage corresponding grooves cast in the drum 7 and are held in position the former by a small plate 15 secured to the drum disc by a screw 16 and the latter by the free end of a leaf spring 17 the fixed end of which acts as a small plate to hold the end 14 of the pick-up member and is fixed to the drum disc by another screw 18. As illustrated in Figs. 2, 3 and 4 the portion of end 13 which extends within the drum is formed with a cranked portion 19 which is acted upon by the free end of leaf spring 17. As will be apparent from Fig. 4 this cranked end can occupy two alternative positions indicated by 19 and 19' and defined by check members 20, 21 cast integrally with the drum disc. The corresponding positions of leaf spring 17 are shown at 17, 17'.

In closed position the pick-up member occupies the position shown in thick lines at 12, Fig. 1, and in opened position it is tilted to the position 12' as indicated in the same figure. From the latter it will be seen that during the movement of rotation of the pick-up member about the drum axis the bent 22 of the pick-up loop engages at each turn a check member 23 fixed to the supporting member 2. This check member may have any profile consistent with the action it exerts upon the pick-up member. In the embodiment illustrated the working surface of the check member is shaped so as to damp out shocks between the cooperating parts. In operation this check member, acting as a fixed point, causes the pick-up loop to be tilted by 90°, as will be seen in Fig. 6 showing the consecutive positions occupied by the loop portion adjacent to the aforesaid bent 22. This rocking movement of the pick-up produced by the engagement thereof with the check member 23 sould have an amplitude sufficient to enable the cranked portion 19 of end 13 to clear the dead point with respect to, and against the resiliency of spring 17 (Fig. 4). Then the spring 17 will urge the pick-up member to its closed position until the cranked portion 19 reaches the position indicated at 19'. It is therefore obvious that the leaf spring 17 produces but the second half only of the closing stroke.

As will be seen from Fig. 4 it is an object of leaf spring 17 to lock up within a certain extent the pick-up member in each of its closed or open positions, however with a force sufficient to resist any undesired movements of the pick-up member which may be caused by forces of inertia while permitting the displacement thereof when it is controlled either by the check member during the closing stroke or by the angler's manual action during the opening stroke.

From the foregoing the operation of the device may be summed up as follows:

Assuming the reel to have thread wound thereon, the angler will open the pick-up member by hand to allow the thread to be unreeled during the fishing action. For re-winding the thread about the reel he than actuates the crank 8 so as to rotate the drum 7 and therefore the pick-up member 12 fulcrummed thereon. During the first revolution the pick-up member will engage the check member 23 and be closed firstly through the action exerted thereby and then by the resilient action of spring 17. From this moment the pick-up takes hold of the thread and through its movement of rotation winds it on the reel in the conventional manner.

It will be readily understood by those conversant with the art that many improvements and modifications commonly devised for stationary drum reels may be brought to the fishing reel according to this invention without departing from the spirit and scope thereof; thus, amongst other examples, the reel brake, the relative axial movement of the reel and drum during the rotation, may be varied without impairing the originality of the invention as set forth in the appended claim.

What I claim is:

A spinning reel; comprising a reel base for attachment to a casting rod, a support post extending from said base and having a housing integral with the free end thereof, a shaft rotatably mounted in said housing with its axis extending substantially parallel to said base, a rotary drum on said shaft including a disc-like main part perpendicular to, and concentric with, said shaft and a cylindrical flange extending from the periphery of said main part, a spool rotatable coaxially with said drum and having a peripheral, cylindrical skirt loosely surrounding an axial portion of said flange, a pick-up device including a pick-up bail in the form of a wire loop having its opposite ends extending into said drum at diametrically opposed locations adjacent said main part of the drum and there mounted for pivoting between casting and retrieving positions, one of said ends of the wire bail terminating within said drum in a radial crank arm, stop members formed on said disc-like main part of the drum and interposed in the path of said crank arm during pivoting of the wire loop to limit the swinging of said crank arm in the opposite directions and thereby to determine said casting and retrieving positions of the wire loop, and a cantilever spring member secured at one end to said disc-like main part of the drum and there overlying the other end of said wire loop to prevent disengagement of the latter from its pivotal mounting, the other end of said spring member resiliently engaging against said crank arm to urge the latter against one of said stop members when said crank arm is displaced beyond the midpoint between said stop members, said wire loop having a bent portion radially outside of said skirt of the spool, and said support post having a fixed, curved cam surface extending into the path of rotation of said bent portion of the wire loop when the latter is rotated in its casting position by turning of said drum so that said cam surface then engages said bent portion and swings said wire loop to displace said crank arm beyond said midpoint whereby said spring member completes the movement of said wire loop to its retrieving position.

References Cited in the file of this patent

UNITED STATES PATENTS

| | | |
|---|---|---|
| 2,712,419 | Martini | July 5, 1955 |

FOREIGN PATENTS

| | | |
|---|---|---|
| 878,594 | France | Oct. 19, 1942 |
| 919,747 | France | Dec. 9, 1946 |
| 941,464 | France | July 19, 1948 |
| 950,630 | France | Mar. 28, 1949 |